Jan. 26, 1932.  C. R. BUTLER  1,842,745

PISTON

Filed Dec. 4, 1925   3 Sheets-Sheet 1

INVENTOR.
CHARLES R. BUTLER,
BY
ATTORNEY.

Jan. 26, 1932. C. R. BUTLER 1,842,745
PISTON
Filed Dec. 4, 1925 3 Sheets-Sheet 2
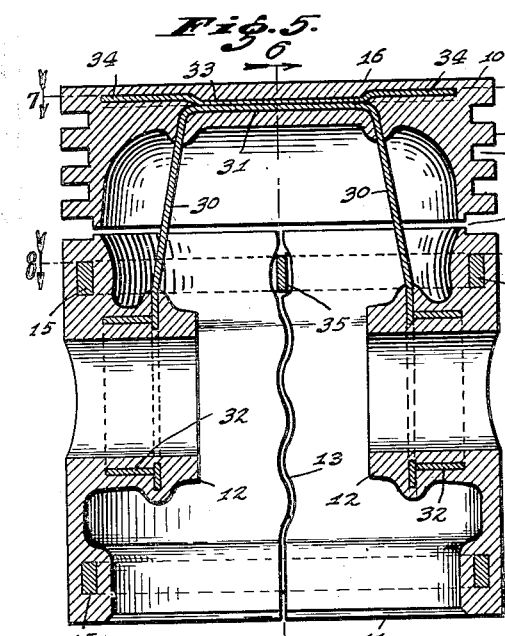
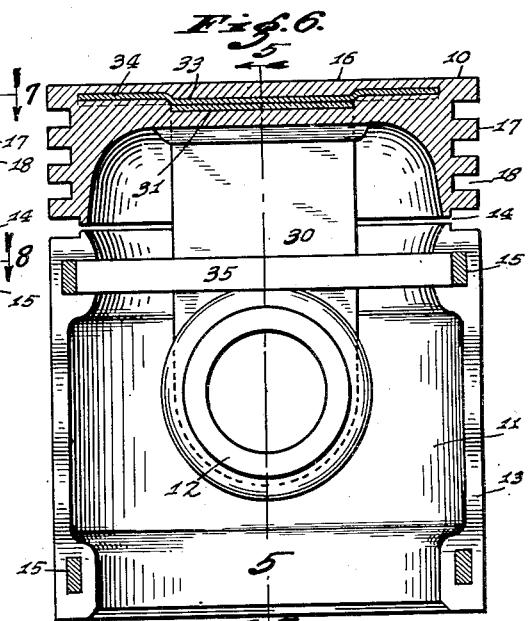
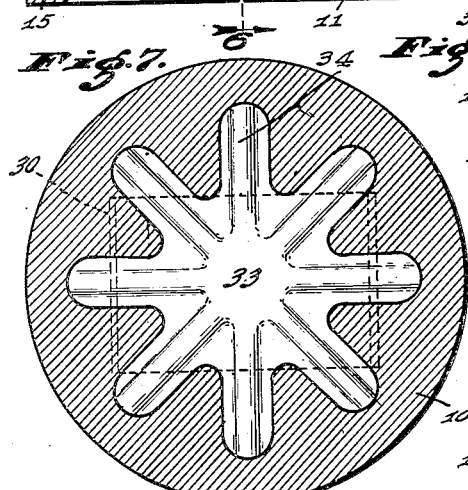
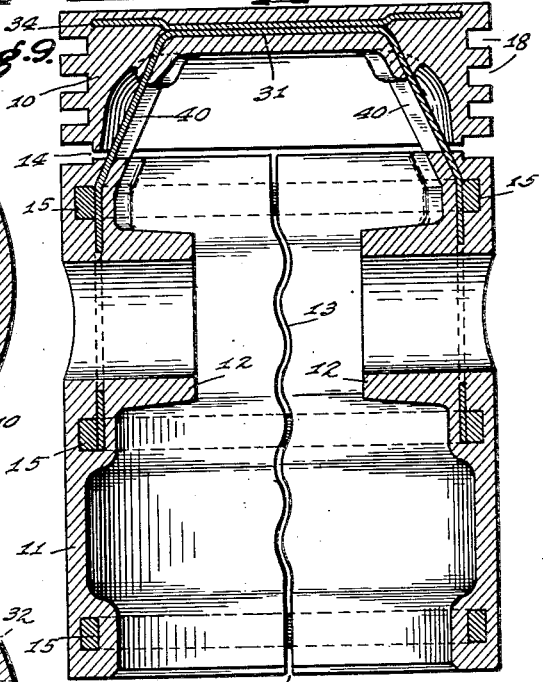
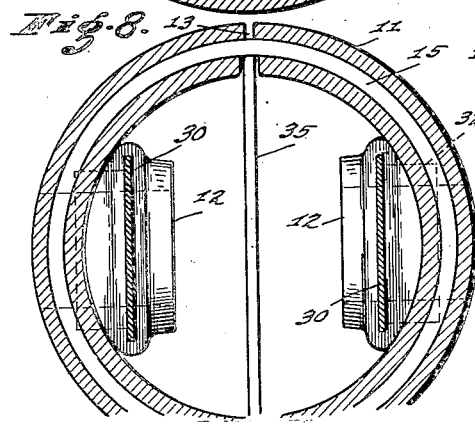
INVENTOR.
CHARLES R. BUTLER,
BY
ATTORNEY.

Jan. 26, 1932.   C. R. BUTLER   1,842,745
PISTON
Filed Dec. 4, 1925   3 Sheets-Sheet 3
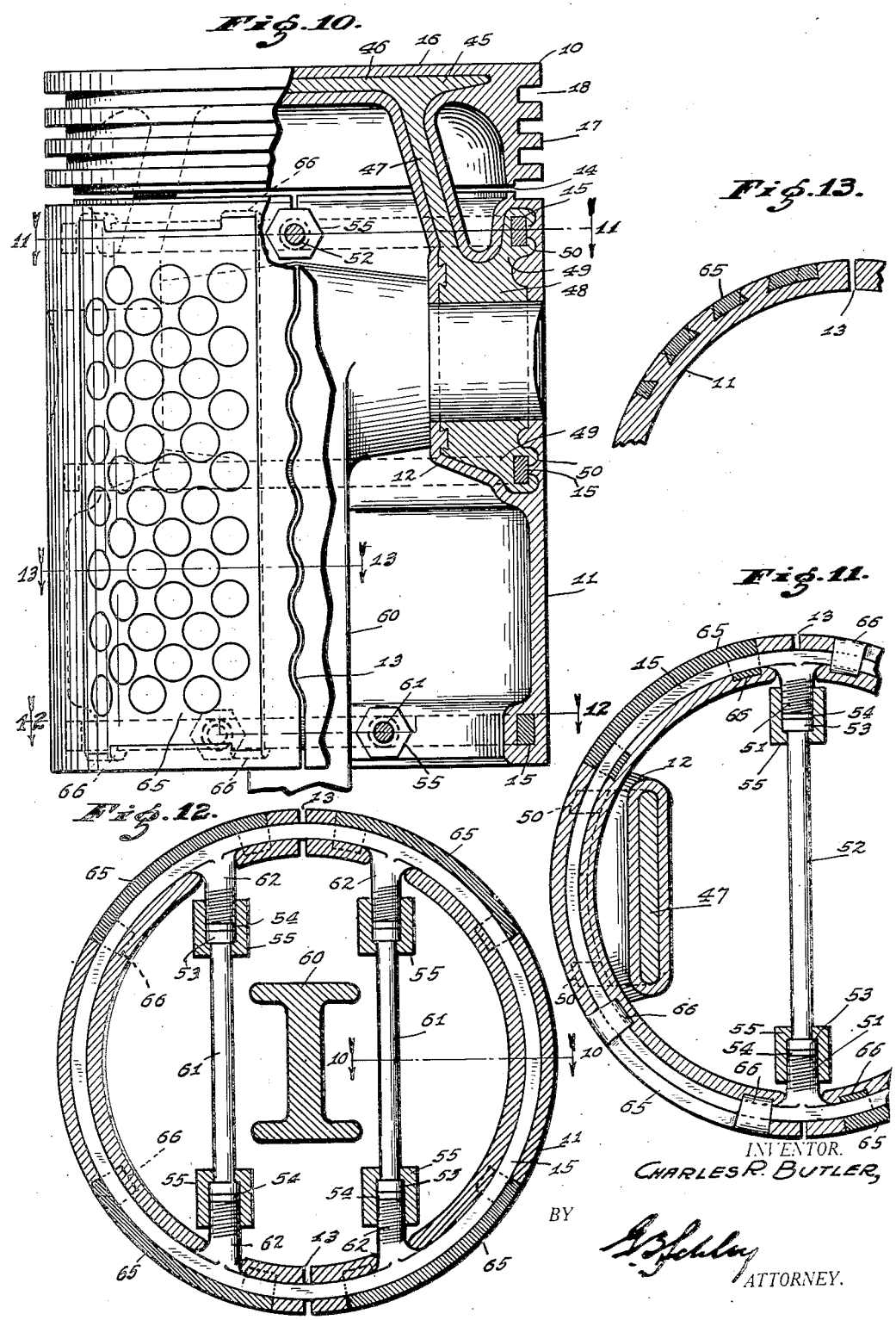
INVENTOR.
CHARLES R. BUTLER,
BY
ATTORNEY.

Patented Jan. 26, 1932

1,842,745

UNITED STATES PATENT OFFICE

CHARLES R. BUTLER, OF INDIANAPOLIS, INDIANA

PISTON

Application filed December 4, 1925. Serial No. 73,097.

It is the object of my invention to produce a piston of the type employed in compressors or internal combustion engines, which piston, though being made of a light metal, such as aluminum, having a relatively high co-efficient of expansion, will not expand under the high temperature to which it is subject to an extent such that it will bind in the cylinder. More specifically, it is the object of my invention to produce a piston in which relatively large expansion in the head of the piston will not be transmitted to the skirt of the piston. A further object of my invention is to provide in such a piston wearing plates of a material better suited for bearing purposes than is aluminum.

I accomplish the above objects by completely severing the skirt of the piston from the piston head except for struts which extend within the piston from the closed end of the piston head to the skirt, these struts preferably being attached to the skirt at the wrist-pin bosses. To increase the wearing qualities of my piston, I insert in those surfaces most subject to wear strips of a bearing metal such as bronze.

Figure 1:
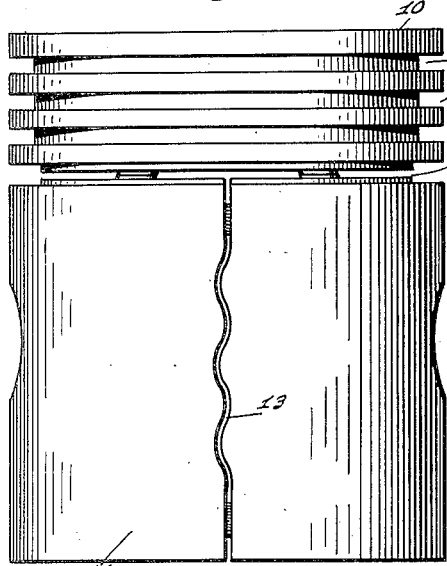
Figure 2:
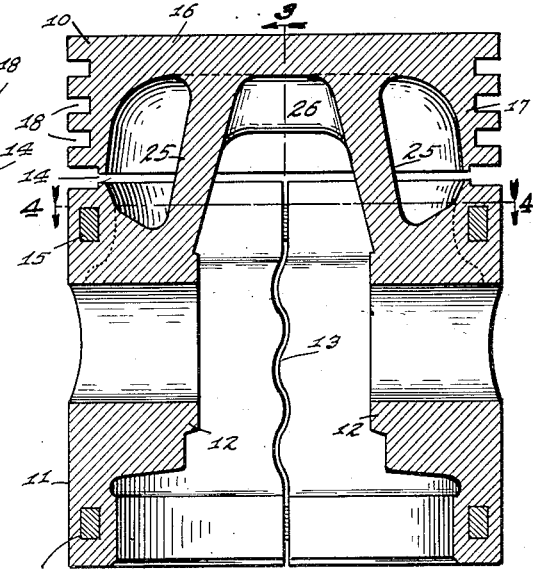
Figure 3:
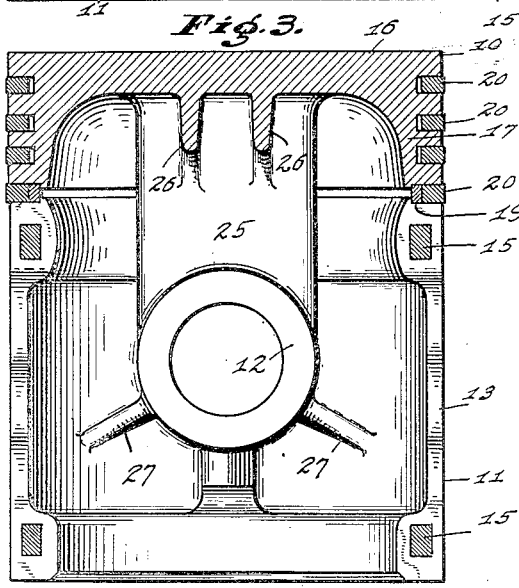
Figure 4:
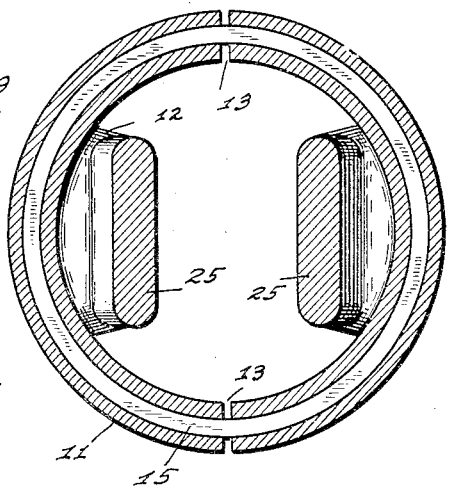

The accompanying drawings illustrate my invention: Fig. 1 is an elevation of my improved piston; Fig. 2 is a longitudinal central section of my piston in the plane of the wrist-pin bosses; Fig. 3 is a longitudinal central section on the line 3—3 of Fig. 2; Fig. 4 is a transverse cross-section on the line 4—4 of Fig. 2; Fig. 5 is a longitudinal section on the line 5—5 of Fig. 6 showing a piston embodying a modification of my invention; Fig. 6 is a longitudinal section on the line 6—6 of Fig. 5; Figs. 7 and 8 are transverse sections respectively on the lines 7—7 and 8—8 of Fig. 5; Fig. 9 is a longitudinal section in the plane of the wrist pin bosses through a pin embodying a further modification of my invention; Fig. 10 is a side elevation of the piston embodying a still further modification of my invention, but with the right side of the view in section on the line 10—10 of Fig. 12 to show the interior construction; and Figs. 11, 12, and 13 are transverse sections respectively on the lines 11—11, 12—12, and 13—13 of Fig. 10.

While several modifications of my invention are shown and described, certain features are common to all. My piston is formed of a suitable light metal, such as aluminum, and comprises a head 10 and a skirt 11, the latter being provided with diametrically opposite bosses 12 for the reception of the wrist pin by which the piston is connected to the connecting rod. The piston skirt 11 is divided into segments by means of wavy slots 13. I have shown the skirt as divided into two segments by two diametrically opposite wavy slots 13, preferably in a plane substantially perpendicular to that of the wrist-pin bosses, which slots extend from the bottom of the skirt to a point near the head end of the piston where they join an annular slot 14 which passes through the piston skirt and serves to sever it completely from the piston head at the periphery of the piston. The slots 13 are preferably formed during the casting of the piston as disclosed in my co-pending application Serial No. 590,800, filed September 27, 1922. Embedded in the wall of the piston skirt are one or more rings 15 of steel or some similar material which has a co-efficient of expansion smaller than that of the aluminum of which I prefer to make my piston. These rings are preferably continuous rings and bridge the slots 13.

The head 10 of the piston comprises the closed end 16, which is preferably plane, and a short cylindrical portion 17 which is provided with one or more piston-ring grooves 18.

The slot 14 which separates the head of the piston from the skirt may, if desired, be shouldered so that it is adapted to receive a ring 19. This ring 19 may be merely a split ring, or if desired it may be made in two or more separate segments. Desirably, it fits tightly within the wider portion of the slot 14 and is seated against the shoulder of such slot. Piston rings 20 are located in the grooves 18 and in the slot 14, the ring 19 being thin enough radially to permit the use of a piston ring 20 in the slot 14.

The head of the piston is supported from the skirt by means of two members or struts which extend from the lower surface of the closed end 16 of the piston to the skirt thereof.

In the piston illustrated in Figs. 1 to 4 inclusive, the struts 25 which connect the head 10 and skirt 11 of the piston are integral with the piston and skirt and extend between the closed end 16 of the piston and the wrist-pin bosses 12. If desired, ribs 26 may be provided for the purpose of strengthening and cooling the piston head. In addition, if desired, additional ribs 27 may be provided between the wrist-pin bosses and the piston skirt.

In the modification of my invention illustrated in Figs. 5 to 8 inclusive, the struts 30 which connect the head 10 and skirt 11 are formed of metal different from that of the head and skirt and are embedded in the piston during the casting thereof. The struts 30 may conveniently be the downwardly extending portions of an inverted U-shaped sheet-metal stamping, the intermediate portion 31 of which is embedded in the closed end 16 of the piston. These struts join the piston skirt at the wrist-pin bosses. Before being inserted in the mold in which the piston is cast, the lower ends of the struts 30 are provided with holes somewhat larger in diameter than the finished hole for the reception of the wrist-pin is to be. This is done in order that the bearing surface for the wrist-pin may be solely of piston metal. Surrounding the holes through the lower ends of the struts 30 are collars 32 which are welded to the struts 30 and serve as additional means for anchoring the lower ends of the struts in the wrist-pin bosses.

Preferably, although not necessarily, I reinforce the closed end 16 of the piston head by means of a metal spider 33 having a plurality of radiating arms. This spider 33 may be attached to the intermediate portion 31 as by welding or any other suitable means. Preferably, each arm of the spider 33 is provided with a longitudinal rib 34 in order to make the spider more rigid.

In Figs. 5, 6, and 8, I have shown a transverse brace 35 which extends diametrically across the piston in the plane of the upper steel ring 15. This brace 35 at its ends is joined as by welding to the upper ring 15 before the piston is cast. The brace 35 should of course be located a sufficient distance above the center line of the wrist pin to clear the end of the connecting rod (not shown). While I have shown this cross brace 35 only in connection with the piston illustrated in Figs. 5 to 8 inclusive, it will be evident that it is applicable to any form my piston may take.

I have illustrated in Fig. 9 a piston somewhat similar to that shown in Figs. 5 to 8 inclusive, but differing from such piston in that the struts which connect the piston head and skirt are not attached to the wrist-pin bosses. The piston illustrated in Fig. 9 is provided with three reinforcing rings 15 instead of the two rings 15 shown in Figs. 5 to 8, two upper rings 15 being located on opposite sides of the wrist-pin bosses 12. The head of this piston may be provided with the reinforcing spider 33 to which are fixed struts 40 which extend downward and outward from the closed end of the piston to the inner surface of the upper two reinforcing rings 15. Before the piston is cast, the struts 40 are united to the two upper rings 15, preferably by welding.

In Figs. 10 to 13 I have illustrated a form of my invention particularly adaptable to large pistons having relatively short wrist-pin bosses. In this piston, I embed during the casting operation a reinforcing member 45 which is of some metal having a greater strength than has the aluminum of which the piston proper is formed. I prefer to use an aluminum-bronze casting for the reinforcing member 45, as aluminum-bronze is much stronger than unalloyed aluminum and has a co-efficient of expansion substantially equal to that of aluminum.

The reinforcing member 45 comprises a substantially flat, disk-shaped top 46 from which depend two struts 47 having at their lower ends enlargements 48 which form the major portion of the wrist-pin bosses of the piston. Each of the enlargements 48 is provided on its upper and lower sides with projections 49 which are employed to attach the reinforcing member 45 to the reinforcing rings 15. For the purpose of holding the bands 15 in proper relation to the reinforcing member 45, I prefer to provide the projections 49 with fingers 50 which, after the rings 15 have been put in place, may be bent over the outer surface of the rings to hold them in position. After the upper rings 15 and the reinforcing member 45 have been united, the assembly is placed in the piston mold, and the piston is cast.

On large pistons, I may provide the upper ring 15 with a cross brace similar to the brace 35 shown in Figs. 5 to 8 inclusive and I prefer to make this brace adjustable in length in order to regulate the diameter of the piston skirt in the plane perpendicular to that of the wrist-pin bosses. To this end, I affix at diametrically opposite points on the upper ring 15 inwardly projecting threaded bosses 51 which are long enough to project into the interior of the piston beyond the inner surface of the piston skirt. Between the bosses 51 extends a brace 52 having at its ends enlarged heads 53. Between the heads 53 and the inner ends of the bosses 51 I provide replaceable shims 54 which are clamped between the ends of the brace 52 and the bosses 51 by means of suitable screw-caps 55 which engage the screw-threads on the bosses 51. By removing the shims 54 and replacing them with shims of different thickness, I can regulate the diameter of the piston skirt in the plane perpendicular to the wrist pin bosses.

If desired, I may provide the lower end of the piston with transverse braces similar to that employed on the upper reinforcing ring 15. In this location, however, a single brace, such as the brace 52 cannot be employed because of the presence of the connecting rod 60. Instead of a single brace, therefore, I employ two braces 61 located on opposite sides of the connecting rod 60 and spaced sufficiently far therefrom so as not to interfere with its action. Each of the braces 61 extends transversely of the piston between bosses 62 which are united as by welding to the lower reinforcing ring 15. Shims 54 are located between the ends of the braces 61 and their associated bosses 62, the shims and braces being held in place by means of screw-caps 55 substantially the same as those shown in connection with the struts 52. While I have shown a single brace at the top of the skirt and a double brace at the bottom, it is to be understood that my invention is not limited to pistons having but a single brace at the top.

To provide for better wearing qualities in my piston, I may embed in the piston skirt during the casting of the piston plates 65 of a suitable bearing metal such as bronze. To tie these bearing plates 65 to the piston skirt, I provide each bearing plate with a multiplicity of countersunk holes which are filled by the aluminum of the piston skirt when the piston is cast. Each bearing plate 65 may be provided at its ends with projecting fingers 66 which are adapted to be bent over the upper and lower reinforcing rings 15 to hold the plate 65 in place during the casting of the piston.

By completely severing the head of the piston from the skirt by the slot 14, these two portions of the piston may expand or contract radially independently of each other. The temperature of the piston head, particularly that of the end portion 16, greatly exceeds the temperature of the skirt portion; hence if the head of the piston is directly connected to the skirt the relatively large expansion of the head is transmitted to the skirt and tends to increase the diameter of the skirt beyond the diameter it would assume if it were not acted upon by the piston head. By completely severing the cylindrical portion of the head from the skirt at the periphery of the piston I prevent or largely decrease this tendency of the head to expand the skirt. The ring 19, if used, permits relative radial movement between the head and the skirt while serving to transmit longitudinal thrusts therebetween.

The struts which extend from the end 16 of the piston to the skirt transmit thrusts between the piston head and the wrist-pin bosses. The expansion of the end 16 of the piston between the upper ends of the struts is transmitted to an extent to the skirt of the piston and hence tends to increase the diameter of the piston in the plane of the wrist-pin bosses. The extent of the effect so produced upon the skirt can be varied by changing the distance between the upper ends of the struts.

I have found that a majority of internal combustion engine cylinder blocks do not expand equally in all directions under increased temperature. As a result, pistons operating in such cylinder blocks may operate without "slap" at low temperature and slap noticeably when the temperature of the cylinder block increases. I can counteract such a tendency by controlling the distance between the upper ends of the struts of my piston; for, if a cylinder block has a greater expansion in the plane of the wrist-pin bosses than it has in a transverse plane, I can use therein a piston in which the distance between the upper ends of the struts is relatively large and thus produce a greater expansion of my piston in the plane of the wrist-pin bosses.

I claim as my invention:—

1. A hollow piston comprising a head portion and a cylindrical skirt portion separated from said head portion at the periphery thereof, wrist-pin bosses on said skirt portion, thrust-transmitting means located within said piston and integral therewith and extending between said head portion and said wrist-pin bosses, said skirt portion being provided with two opposite longitudinal slots extending throughout the length of said skirt substantially in the longitudinal plane perpendicular to that of the wrist-pin bosses, and an expansion-controlling reinforcing ring of different metal from said skirt embedded therein above the transverse plane of said wrist-pin bosses.

2. A hollow piston, comprising a head and skirt, wrist-pin bosses on said skirt, said skirt being provided with two longitudinal slots substantially in the longitudinal plane perpendicular to that of said wrist-pin bosses, and a transverse brace located within said piston and extending between opposite points of said skirt in a plane perpendicular to that of said wrist-pin bosses, said brace tending to prevent outward movement of the points which it interconnects.

3. A piston as set forth in claim 2, with the addition that said brace is adjustable in length.

4. A hollow piston, comprising a head and skirt, wrist-pin bosses on said skirt, a reinforcing ring of different metal from said skirt embedded in the wall thereof, and a transverse brace located within said piston and extending between opposite points on said ring in a plane perpendicular to that of the wrist-pin bosses.

5. A piston as set forth in claim 4, with the addition that said brace is adjustable in length and is secured at its ends to said ring.

6. A piston, comprising a head portion, a skirt portion separated from said head portion at the periphery thereof, said skirt portion being provided with wrist-pin bosses having alined holes for the reception of a wrist pin, a reinforcing ring embedded in each of said wrist-pin bosses and surrounding the hole therein, and a member united with each of said rings and embedded in the metal of said head portion.

7. In combination with a piston having wrist-pin bosses provided with alined holes for the reception of a wrist pin, each of said bosses being provided with a ring of different metal from that of the piston, said ring being embedded in the wrist-pin boss and surrounding the hole therein to control the expansion of the wrist-pin boss.

8. A hollow piston comprising a head portion and a skirt portion separated from said head portion at the periphery thereof, said skirt portion being provided with two opposite longitudinal slots dividing the skirt portion into two parts, a member located within said piston and extending between said head portion and each of said skirt-parts and joining said head portion at a point spaced inwardly from the periphery thereof, and one or more reinforcing rings of different metal from the piston skirt embedded in the wall thereof, one of said rings being located near the top of said skirt.

9. A hollow piston, comprising a head having a depending peripheral flange provided with one or more grooves for the reception of piston rings, a skirt portion located below said flange and spaced therefrom at its periphery, wrist-pin bosses on said skirt portion, a thrust-transmitting member extending between each of said wrist-pin bosses and said head, said thrust-transmitting members joining said head at points spaced inwardly from said flange, and a reinforcing ring of different metal from said skirt embedded therein above the transverse plane of said wrist-pin bosses.

10. A hollow piston, comprising a head having a depending peripheral flange provided with one or more grooves for the reception of piston rings, a skirt portion located below said flange and spaced therefrom at its periphery, wrist-pin bosses on said skirt portion, a reinforcing ring of different metal from said skirt embedded therein above the transverse plane of said wrist-pin bosses, and thrust-transmitting members of different metal from said skirt for connecting said head and skirt, said thrust-transmitting members being attached to said reinforcing ring and being embedded in said head and joining said head at points spaced inwardly from said flange.

11. A piston, comprising a hollow cylindrical shell having a closed end, said shell being provided with a circumferential slot extending through it to divide the piston into a head portion and a skirt portion, wrist-pin bosses below said circumferential slot, means attached to said skirt portion in the vicinity of said wrist-pin bosses and to said head portion at points spaced inwardly from the periphery thereof for connecting said head and skirt portions, said head and skirt portions being free from any interconnection in the vicinity of the diametral plane perpendicular to that of said wrist-pin bosses, said skirt portion being provided circumferentially intermediate the wrist-pin bosses with longitudinal slots joining said circumferential slot and extending downwardly therefrom, and a reinforcing ring of different material from that of said skirt portion embedded in the wall thereof, said ring being located above the transverse plane of said wrist-pin bosses.

12. A piston, comprising a hollow cylindrical shell having a closed end, said shell being provided with a circumferential slot extending through it to divide the piston into a head portion and a skirt portion, wrist-pin bosses below said circumferential slot, means attached to said skirt portion in the vicinity of said wrist-pin bosses and to said head portion at points spaced inwardly from the periphery thereof for connecting said head and skirt portions, said head and skirt portions being free from any interconnection in the vicinity of the diametral plane perpendicular to that of said wrist-pin bosses, said skirt portion being provided circumferentially intermediate the wrist-pin bosses with longitudinal slots joining said circumferential slot and extending downwardly therefrom to a point below the transverse plane of the wrist-pin bosses, and a reinforcing ring of different material from that of said skirt portion embedded in the wall thereof, said ring being located above the transverse plane of said wrist-pin bosses.

13. In a piston of the light alloy type, a head, a split skirt having pin bosses extending inwardly therefrom, said head and skirt being separated from each other by a circumferential slot, a pair of hanger members integral with the head and connected to the skirt at said bosses, said hanger members being spaced at said head a distance less than one-half the diameter of said head, whereby to minimize the effect of the expansion of said head upon said hangers and skirt, and said hangers being relatively flexible as compared to the skirt, whereby to permit flexing of the hanger members without expansion and distortion of the skirt in response to the expansion of that portion of the head between the points of connection of the hanger members therewith.

14. In a piston of the light alloy type, a head, a split skirt having pin bosses extending inwardly therefrom, said head and skirt being separated from each other by a circumferential slot, a pair of hanger members integral with the head and connected to the skirt at said bosses, said hanger members being spaced at said head a distance less than one-half the diameter of said head, whereby to minimize the effect of the expansion of said head upon said hangers and skirt, and said hangers being relatively flexible as compared to the skirt, whereby to permit flexing of the hanger members without expansion and distortion of the skirt in response to the expansion of that portion of the head between the points of connection of the hanger members therewith, and internal annular ribs reinforcing said skirt.

In witness whereof, I have hereunto set my hand at Indianapolis, Indiana, this 2nd day of December, A. D. one thousand nine hundred and twenty-five.

CHARLES R. BUTLER.